United States Patent
Cherubini et al.

(10) Patent No.: US 7,903,360 B2
(45) Date of Patent: Mar. 8, 2011

(54) RECOVERING SERVO INFORMATION FROM A SYNCHRONOUS SERVO CHANNEL

(75) Inventors: Giovanni Cherubini, Rueschlikon (CH); Robert Allen Hutchins, Tucson, AZ (US); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/236,450

(22) Filed: Sep. 23, 2008

(65) Prior Publication Data

US 2010/0073800 A1    Mar. 25, 2010

(51) Int. Cl.
   *G11B 5/09*    (2006.01)
(52) U.S. Cl. .................................. 360/51; 360/75
(58) Field of Classification Search .................. None
   See application file for complete search history.

(56) References Cited

U.S. PATENT DOCUMENTS

| | | | |
|---|---|---|---|
| 7,365,929 B2 | 4/2008 | Cherubini et al. | |
| 7,433,142 B2* | 10/2008 | Bui et al. | 360/46 |
| 2003/0053245 A1* | 3/2003 | Ozdemir | 360/77.08 |
| 2008/0151416 A1 | 6/2008 | Cherubini et al. | |

OTHER PUBLICATIONS

US Patent Application entitled "Servo Channel For Tape Drive Systems", U.S. Appl. No. 11/969,184, filed Jan. 3, 2008, by inventors G. Cherubini, R.D. Cideciyan, E.S. Eleftheriou, R.A. Hutchins and J. Jelitto.
R.C. Barrett, et al., "Timing-Based Track-Following Servo for Linear Tape Systems", IEEE, 1998, pp. 1872-1877.
* cited by examiner

*Primary Examiner* — Jason C Olson
(74) *Attorney, Agent, or Firm* — David W. Victor; Konrad Raynes & Victor LLP (57) ABSTRACT

Provided are a method, servo channel, and tape drive for recovering servo information from a synchronous servo channel. An interpolator reads samples of a servo signal obtained from a servo reader at a rate of one servo sample per clock interval, to produce up to M interpolated servo samples per clock interval. A first buffer buffers interpolation time instants at which the interpolator generates interpolated servo samples. The interpolated servo samples are buffered in a second buffer and the interpolated servo samples are outputted from the second buffer to a correlator to produce correlation signal samples.

20 Claims, 7 Drawing Sheets

RECOVERING SERVO INFORMATION FROM A SYNCHRONOUS SERVO CHANNEL

BACKGROUND

1. Field

The present invention relates to a method, servo channel, and tape drive for recovering servo information from a synchronous servo channel.

2. Description of the Related Art

In timing-based servo (TBS) systems, recorded servo patterns consist of magnetic transitions with two different azimuthal slopes. Head position is derived from the relative timing of pulses, or dibits, generated by a narrow head reading the servo patterns. TBS patterns also allow the encoding of additional longitudinal position (LPOS) information without affecting the generation of the transversal position error signal (PES). This is obtained by shifting transitions from their nominal pattern position using pulse-position modulation (PPM). Traditionally, the detection of LPOS information bits is based on the observation of the arrival times of the shifted dibit peaks within the servo bursts at the servo reader output. A specification for the servo format in current tape drives is provided by the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the World Wide Web (www) at ultrium.com.

Figure 1:
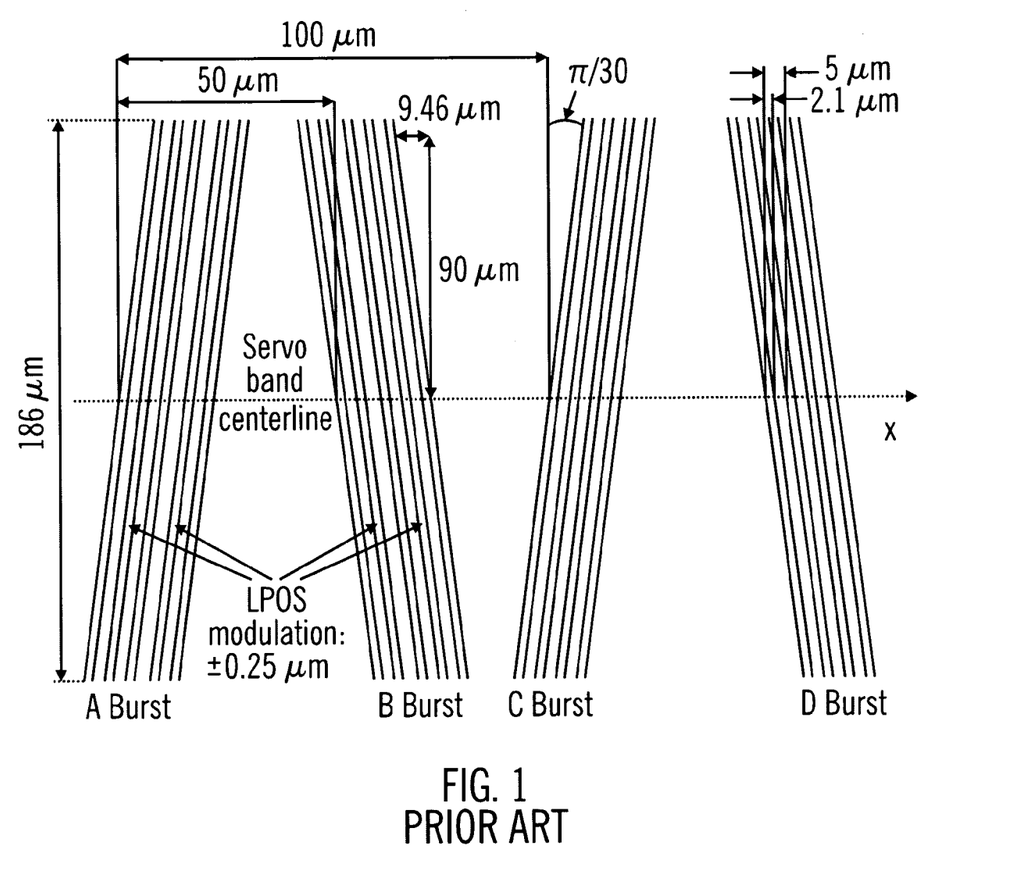
FIG. 1 illustrates a servo frame in a manner known in the prior art.

The timing-based servo (TBS) technology, which was developed specifically for linear tape drives and is also used in all LTO tape drive products, provides the basic structure of a servo frame, consisting of four servo bursts, as shown in FIG. 1. The signal obtained by reading the servo pattern is used to extract essential servo-channel parameters such as tape velocity, read head transversal (y)-position information, and longitudinal position (LPOS) information, which is encoded by using pulse-position modulation (PPM) with a modulation width of ±0.25 µm in LTO drives, as also shown in FIG. 1.

The servo frame of FIG. 1 has transitions on tape with an azimuth angle of 6 degrees. Each stripe is translated by a servo reader into a pulse called dibit, which exhibits a positive peak and a negative peak. The four A, B, C, and D bursts include from left-to-right a sequence of 5-5-4-4 dibits. The peak locations in the servo bursts are used to determine the transversal position of the reader. The frequency at which the bursts appear can be used to determine the velocity of tape. One may also decode bits encoded in the second and fourth dibits in the A and B bursts to reconstruct the longitudinal position.

In order to obtain sufficient resolution of the sampled servo signal at high tape velocities using traditional asynchronous architectures, high analog-to-digital converter (ADC) sampling rates are required. For example, if the highest target velocity is 12.5 m/s, then a resolution of 0.83 µm is obtained by assuming an ADC sampling rate of 15 MHz. Clearly, such a resolution is not adequate when one wants to detect LPOS bits with a modulation width of ±0.25 µm.

In certain prior art synchronous servo channel architectures, a dynamic interpolator allows any sampling rate at the servo channel detector input, with the limitation that aliasing effects have to be avoided. Synchronous operation of the servo channel requires the generation of a time base for signal interpolation, so that interpolated signal samples are obtained at a predetermined fixed rate of $1/x_{int}$ samples per micrometer, where $x_{int}$ denotes the nominal step interpolation distance, independent of tape velocity. For example, for $x_{int}=0.05$ µm the rate $1/x_{int}$ corresponds to 20 samples per micrometer.

The natural reference for the generation of the time base is provided by the servo bursts, which periodically appear at the servo reader output. The signal at the servo reader output may be regarded as a pilot signal, from which it is possible to extract timing information. The extraction of timing information from the servo reader signal, however, is not straightforward, as the servo bursts into which a servo frame is subdivided, namely A, B, C, and D bursts comprising 5, 5, 4, and 4 dibits, respectively, are not equally spaced. Moreover, the spacing between the servo bursts depends on the transversal (y)-position of the servo read head. Furthermore, the repetition period of the servo frames, as well as the time interval between consecutive dibits within a servo burst, depend on the tape velocity. Finally, it is necessary to take into account the presence of pulse position modulation for the encoding of LPOS information in the 2nd and 4th dibit of the A and B bursts.

In one prior art technique, a phase locked loop (PLL) may be used to achieve timing recovery in tracking mode during track following, which has as input the pilot signal represented by the servo bursts, as well as knowledge about the tape velocity and servo reader y-position.

SUMMARY

Provided are a method, servo channel, and tape drive for recovering servo information from a synchronous servo channel. An interpolator reads samples of a servo signal obtained from a servo reader at a rate of one servo sample per clock interval, to produce up to M interpolated servo samples per clock interval. A first buffer buffers interpolation time instants at which the interpolator generates interpolated servo samples. The interpolated servo samples are buffered in a second buffer and the interpolated servo samples are outputted from the second buffer to a correlator to produce correlation signal samples.

DETAILED DESCRIPTION

Figure 2:
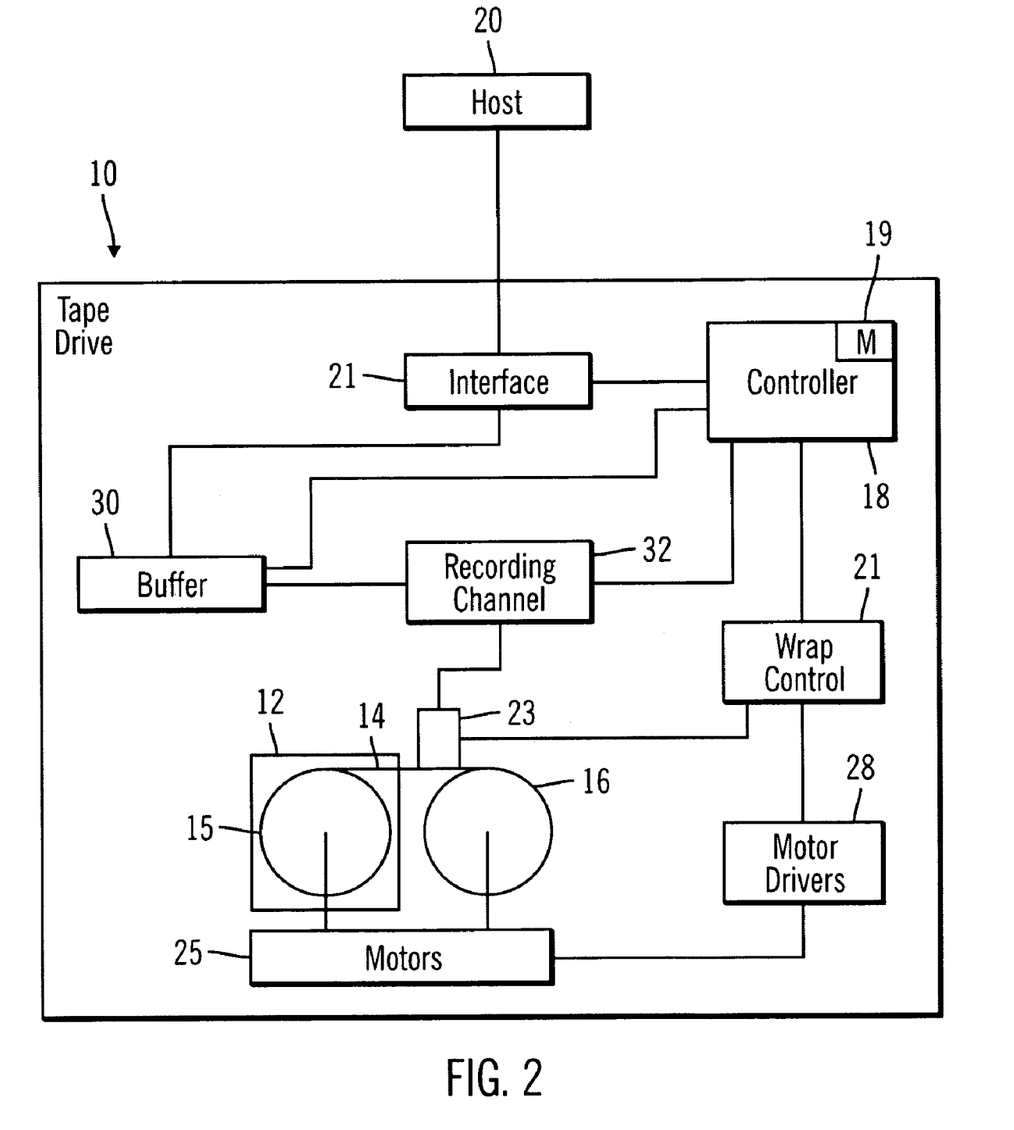
FIG. 2 illustrates an embodiment of a tape drive in which described embodiments are implemented.

FIG. 2 illustrates an embodiment of a magnetic tape drive 10. The magnetic tape drive provides a means for reading and writing information with respect to a magnetic tape 14 of a magnetic tape cartridge 12. Magnetic tape cartridges include a magnetic tape storage medium to record data to be retrieved at a subsequent time. Further, the magnetic tape cartridges may be interchanged between tape drives, such that a magnetic tape written on one tape drive will be read by another tape drive. The magnetic tape cartridge 12 comprises a length of magnetic tape 14 wound on one or two reels 15, 16.

A single reel magnetic tape cartridge 12 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive. In alternative embodiments, additional tape formats that may be used include Digital Linear Tape (DLT), Digital Audio Tape (DAT), etc.

The magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc. The magnetic tape cartridge 12 may be inserted in the magnetic tape drive 10, and loaded by the magnetic tape drive so that one or more read and/or write heads 23 of the recording system read and/or write information in the form of signals with respect to the magnetic tape 14 as the tape is moved longitudinally by motors 25 which rotate the reels 15, 16. The magnetic tape typically comprises a plurality of parallel tracks, or groups of tracks. In certain tape formats, such as the LTO format, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a read/write channel 32, as is known to those of skill in the art.

The tape drive 10 system further includes motors 25 and reels 15, 16 to move the magnetic tape 14 with respect to the read head(s) 23 such that the read head(s) may detect magnetic signals on the magnetic tape. A read channel of the read/write channel 32 digitally samples the magnetic signals detected by the read head(s) to provide digital samples of the magnetic signals for further processing.

Figure 3:
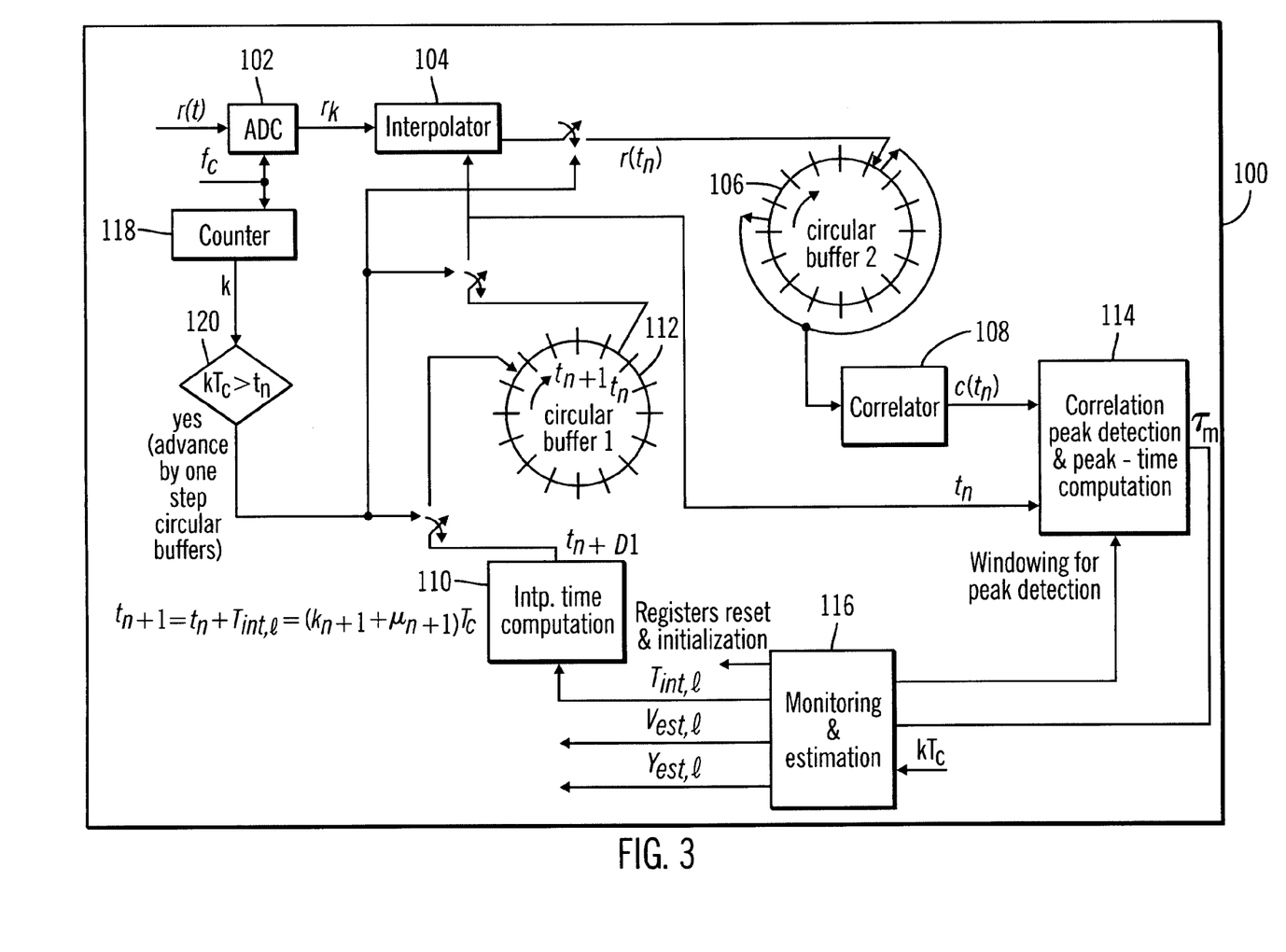
FIG. 3 illustrates the features of a servo channel which can process at most one interpolated signal sample per ADC clock interval.

FIG. 3 illustrates a first embodiment of a synchronous servo channel 100, which may be implemented in the recording channel 32 of the tape drive 10 (FIG. 2), that is used to extract essential servo-channel parameters such as tape velocity, read head y-position, and longitudinal position (LPOS) information. The servo channel 100 includes an analog-to-digital converter (ADC) 102 that receives the analog waveform r(t) from the servo reader (not shown) and outputs the sequence of servo samples r(k) at time instants $kT_c$ (current time), where the counter value k denotes the clock cycle at which the sample is generated within a servo frame, and $T_c$ denotes the clock interval, which is related to the fixed ADC clock frequency by $T_c=1/f_c$.

The servo channel 100 further includes a counter 118 that is incremented every ADC clock cycle with frequency $f_c$ and is reset at the end of every servo frame. The counter 118 value k is supplied to a comparator 120, which calculates a current time $kT_c$. The current time $kT_c$ comprises the time that has elapsed since the counter 118 was reset, and corresponds to the time that has elapsed since the beginning of the current servo frame.

The value $kT_c$ obtained from counter 118 is compared with the value of the next interpolation instant ($t_n$), which is stored in a first circular buffer 112. A new interpolation and correlation iteration is initiated if the current time is larger than the next interpolation time instant, $kT_c > t_n$.

Figure 8:
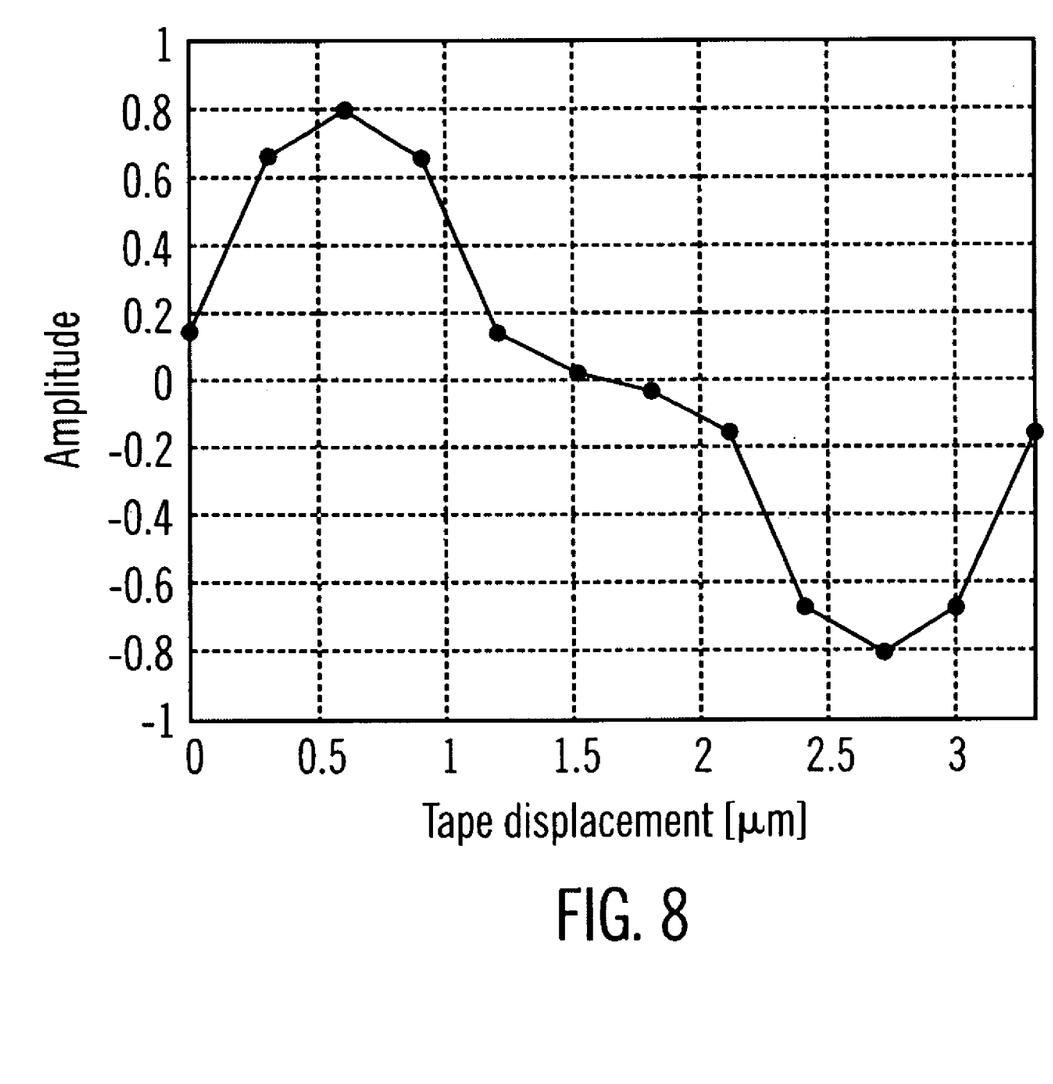
FIG. 8 shows an example of a reference waveform with N=12 coefficients.

If the condition $kT_c > t_n$ is satisfied, as determined by comparator 120, one new interpolated signal sample, $r(t_n)$, is generated, and one new correlation value, $c(t_n)$, is computed. An interpolator 104 receives the sequence of servo samples r(k) from the ADC 102 and interpolation time instants ($t_n$) from first circular buffer 112, and outputs a sequence of interpolated servo samples $r(t_n)$ at interpolation time instants ($t_n$) to a second circular buffer 106, where the most recent interpolated servo samples are buffered before being output to a correlator 108. The correlator 108 receives the most recent N interpolated servo samples from the second circular buffer 106 and outputs a sequence of correlation output samples $c(t_n)$ at interpolation time instants ($t_n$) into a correlation-peak detection and peak-time computation unit 114. The correlation at time $t_n$ may be calculated according to equation (1) below:

$$c(t_n) = \sum_{i=0}^{N-1} r(t_{n-i}) h_{N-1-i}, \quad (1)$$

where $\{h_i\}_{i=0}^{N-1}$ is the sequence of length N representing the sampled reference waveform. An example of a reference waveform for $x_{int}=300$ nm and N=12 is illustrated in FIG. 8.

The correlation-peak detection and peak-time computation unit 114 receives a sequence of correlation values $c(t_n)$ along with the interpolation time instants ($t_n$). If a correlation peak is detected within the sequence of three consecutive correlation values $\{c(t_n), c(t_{n+1}), c(t_{n+2})\}$, i.e., if $c(t_{n+1}) > c(t_n)$, $c(t_{n+1}) > c(t_{n+2})$, and $c(t_{n+1})$ exceeds a threshold value that is continuously adjusted depending on the signal energy, a new peak-arrival time is computed. Preferably, a linear interpolation method is used to compute the peak-arrival time according to equation (2) below:

$$\tau_j = t_n + \frac{T_{int,l}}{2}\left(1 + \frac{2(c(t_{n+1}) - c(t_n))}{2c(t_{n+1}) - c(t_n) - c(t_{n+2})}\right), \quad (2)$$

where the index j of the correlation peak indicates the position of the detected dibit within the [4 4 5 5] sequence of servo bursts, and $T_{int,l}$ denotes the estimated step interpolation interval at the l-th servo frame, that is, the time interval needed for the tape to move by the nominal step interpolation distance $x_{int}$. Note that the step interpolation interval depends on the tape velocity. Other interpolation methods can be adopted to compute the peak-arrival time.

The correlation-peak detection and peak-time computation unit 114 outputs a sequence of peak arrival times ($\tau_j$) to a monitoring and estimation function unit 116.

The monitoring and estimation function unit 116 computes, at least once per frame, estimates of tape velocity $v_{est,l}$, of y-position of the servo reader $y_{est,l}$, and of step interpolation interval $T_{int,l}$. Furthermore, it generates search windows to limit the search range for the correlation peaks, which are fed back into the correlation-peak detection and peak-time computation unit 114, and re-initializes elements of the servo channel 100 after each servo burst. As soon as the last dibit of a servo burst has been located within the monitoring and estimation function unit 116, the circular buffers 106 and 112 are reset, and $J \geq M$ initial values of interpolation instants within the next search window are written into first circular buffer 112. The parameter M indicates the maximum number of interpolated signal samples that can be processed by the synchronous servo channel per ADC clock interval, and is discussed in detail below. For example, in the embodiment of FIG. 3, M=1 and J=4. If the last dibit of a servo burst coincides with the last dibit of a servo frame, the counter 118 is also reset.

A search window is generated by the monitoring and estimation function 116 to reduce the probability of erroneous detection of correlation peaks in the gaps between consecutive dibit locations. This search window determines the time intervals during which a correlation peak must be detected. The window is determined in dependence of the associated dibit location within the servo burst. For the first dibit within a servo burst a variable-length window is generated, where the length depends on tape velocity and on y-position of the servo reader. Preferably, the length of the window is inversely proportional to the velocity and directly proportional to the distance between consecutive servo bursts in order to account for the uncertainty in the location of the first dibit, which arises in the presence of fast variation of the y-position of the servo reader. For each dibit following the first dibit, the generation of a fixed search window is usually sufficient because of the close dibit spacing within a servo burst. If no valid correlation peak is detected within a search window, loss of timing is declared and re-acquisition of channel parameters is started.

An interpolation time computation unit 110 generates new interpolation time instants ($t_n$) that are output to the first circular buffer 112. As mentioned earlier, the sequence $\{t_n\}$ at the output of the interpolation time computation unit 110 indicates the time instants at which signal samples $\{r(t_n)\}$ are to be determined at the interpolator output so that they are obtained at a desired fixed rate of $1/x_{int}$ samples per micrometer, independent of tape velocity. The variable $x_{int}$ comprises a nominal step interpolation distance, expressed in micrometers. The step interpolation interval $T_{int}$, expressed in microseconds, is the time it takes for the tape to travel over the nominal step interpolation distance $x_{int}$ and is determined according to equation (3) as follows:

$$T_{int} = \frac{x_{int}}{v}, \quad (3)$$

where v denotes the tape velocity in m/s.

In certain implementations, the step interpolation interval $T_{int}$ and the ADC sampling interval $T_c$ are incommensurate. In such embodiments, linear interpolation time computation 110 is preferably employed to obtain signal samples $r(t_n)$ at the interpolation time instants $\{t_n\}$, which are recursively obtained according to equation (4):

$$t_{n+1} = t_n + T_{int,l}. \quad (4)$$

Using equation (3), the step interpolation interval estimate at the l-th servo frame is given by $T_{int,l} = x_{int}/v_{est,l}$, where $v_{est,l}$ denotes the tape velocity estimate. In the interpolation-time computation unit 110, the n-th interpolation instant is expressed according to equation (5) below:

$$\begin{aligned} t_n &= T_c \frac{t_n}{T_c} \\ &= T_c \left( \left\lfloor \frac{t_n}{T_c} \right\rfloor + \mu_n \right) \\ &= T_c (k_n + \mu_n), \end{aligned} \quad (5)$$

where $k_n$ and $\mu_n$ denote the integer part and the fractional part of the n-th interpolation instant, respectively, in terms of multiples of the sampling interval $T_c$. Linear interpolation yields the interpolated signal sample at the output of the interpolator 104 according to equation (6) below:

$$r(t_n) = r_{k_n} + \mu_n (r_{k_n+1} - r_{k_n}). \quad (6)$$

The time-base generation system provides interpolation time instants such that the interpolated servo samples reproduce the signal generated by the servo reader in correspondence to points on tape that are equally spaced by the step interpolation distance $x_{int}$. During track-following servo operations, such points are on a line parallel to the servo band centerline, at a distance y from the centerline.

In the embodiment of FIG. 3, a single interpolation unit and a single correlation unit are available. At any clock interval either one or zero interpolated servo samples can be generated. In this case, the maximum allowed tape velocity is calculated according to equation (7) below:

$$v_{max} = \frac{x_{int}}{T_c}. \quad (7)$$

For example, if $x_{int}$=300 nm, and $f_c$=24 MHz, then the maximum allowed tape velocity is $v_{max}$=7.2 m/s.

In certain embodiments, if the tape velocity is required to satisfy the condition $v > x_{int}/T_c$, more than one interpolation instant $t_n$ may be found within one clock interval. In order to extend the velocity range while keeping the ADC clock frequency at a fixed rate, up to M interpolation steps and up to M correlation steps may be performed within one ADC clock cycle. In this case, the maximum allowed tape velocity is calculated according to equation (8) below:

$$v_{max} = \frac{M x_{int}}{T_c}. \quad (8)$$

Figure 4:
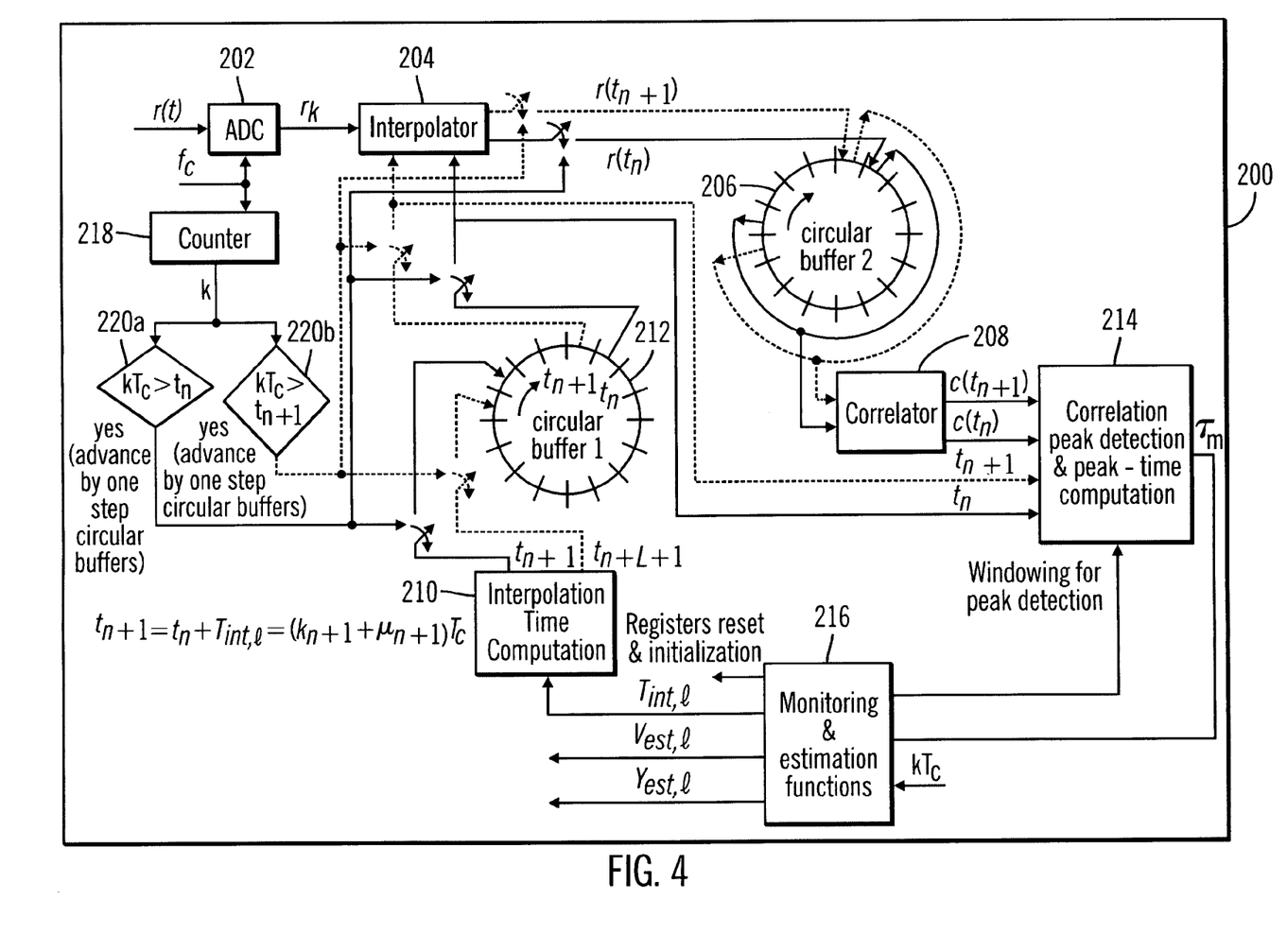
FIG. 4 illustrates the features of a servo channel which can process up to two interpolated signal samples per ADC clock interval.

FIG. 4 shows an example of a synchronous servo channel 200 with M=2. Note that the maximum allowed tape velocity is doubled as compared to the maximum tape velocity as allowed by the embodiment shown in FIG. 3, where M=1. In particular, if $x_{int}$=300 nm and $f_c$=24 MHz, then the choice M=2 leads to $v_{max}$=14.4 m/s. In general, for an arbitrary maximum tape velocity, up to M interpolated servo samples and correlation output samples need to be generated at any clock interval, where the number of operations might vary between 0 and M from clock interval to clock interval. Therefore storing the values of interpolation instants and interpolated servo samples requires a number of storage registers that is not constant at each clock interval. For example, in the embodiment of FIG. 4, where M=2 is assumed, at any clock interval the number of interpolated servo samples that need to be generated and stored may be zero, one, or two.

The components of FIG. 4 202-218, 220a and 220b correspond to components 102-118 and 120 in FIG. 3, respectively. The usage of a first and a second circular buffer 212 and 206 for storing the values of interpolation instants and interpolated signal samples, respectively, allows allocation of a number of storage registers that is not constant at each clock interval. Recalling that M is the maximum number of interpolated signal samples that can be generated within a clock interval, and that N represents the length of the sampled reference waveform, the minimum length of the second circular buffer 106 is L2=N+M−1, whereas the minimum length of the first circular buffer 212 is L1=2M. In the case M=2, if the length of the reference waveform is assumed to be N=12, the minimum length of the first circular buffer 112 is L1=4, and the minimum length of the second circular buffer is L2=13.

In the embodiments of FIGS. 3 and 4, the parameter D1 comprises a number of entries or positions between the read position and the write position to the first circular buffer 112, 212. In other words, the parameter D1 denotes the distance between the read and write positions in the first circular buffer 112, 212. As soon as m interpolation instant values with 0<m≦M are read from the first circular buffer 112, 212 within a clock cycle, that is, the condition $kT_c > t_{n+m-1}$ is verified, a corresponding number of future interpolation instant values are computed by the interpolation time computation unit 110, 210 and written into the first circular buffer 112, 212. The reading of $t_{n+m-1}$ may take place at the same time as the writing of $t_{n+m-1+D1}$, with D1≧M. The choice of D1 is determined by the space that is needed to store up to M new sampling instants and to accommodate any pipelining delay. The read and write pointers to the two circular buffers are accordingly advanced by m positions with 0<m≦M, ready for the next interpolator/correlator operation to take place.

Figure 5:
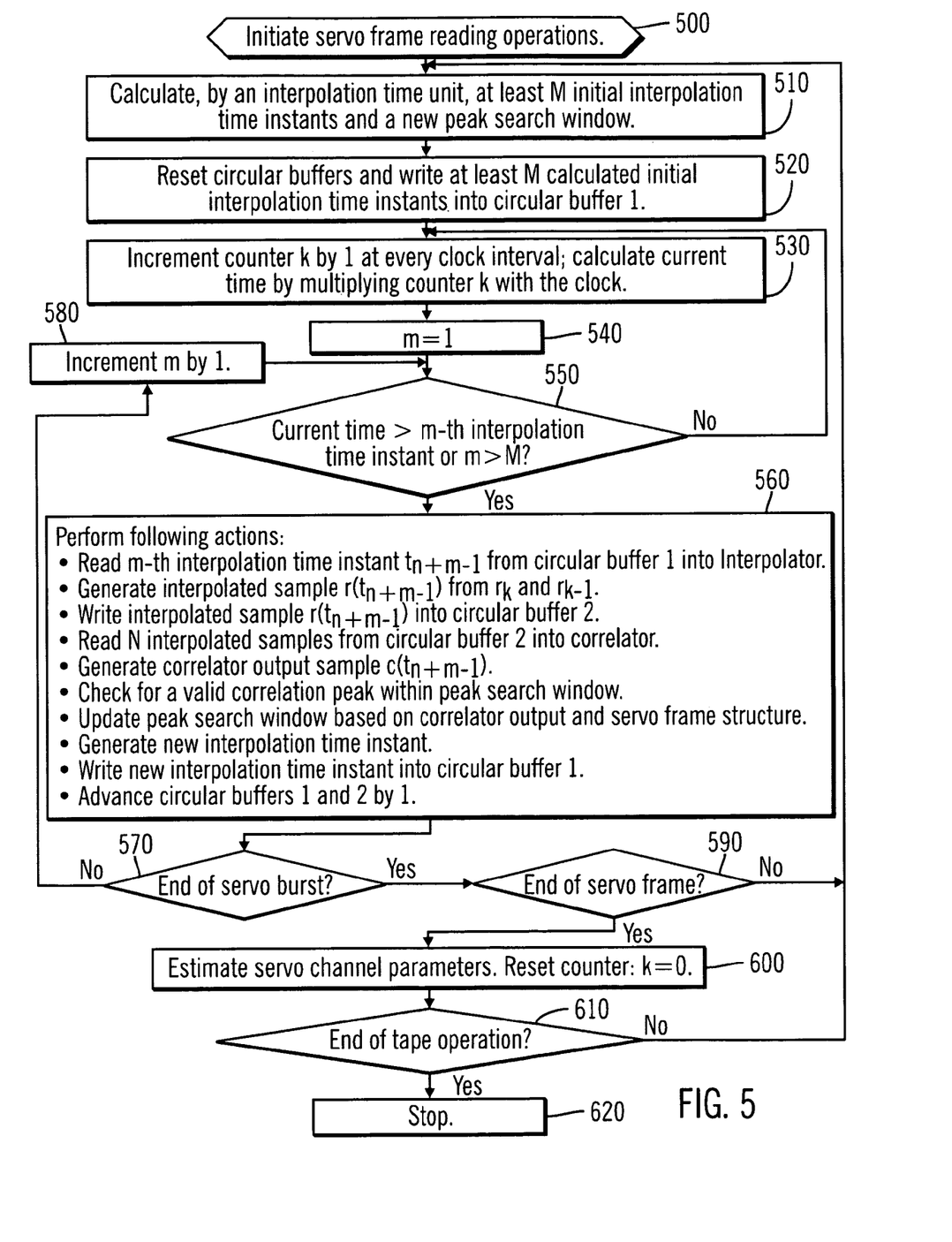
FIG. 5 illustrates logical flow of a servo channel operation which can process up to M interpolated signal samples per ADC clock interval.

FIG. 5 illustrates the sequence of operations performed by the servo channel 100, 200 to generate estimates of tape velocity $v_{est,l}$, of y-position of the servo reader $y_{est,l}$, and of step interpolation interval $T_{int,l}$ from the servo reader output at least once per servo frame, for an arbitrary maximum number M of interpolated samples per clock cycle. The servo channel operation is initialized at block 500 by providing initial estimates of tape velocity $v_{est,0}$, of y-position of the servo reader $y_{est,0}$, and of step interpolation interval $T_{int,0}$, as provided by an independent acquisition unit (not shown) to the servo channel 100, 200. Based on the parameter estimates, an interpolation time computation unit 110, 210 calculates at block 510 at least M initial interpolation time instants. (In FIG. 3, M=1 and in FIG. 4, M=2). Furthermore, a search window of variable length, which determines the time interval during which the correlation peak associated with the first dibit within the next servo burst must be detected, is computed by a monitoring and estimation function unit 116, 216. After resetting the contents of the first circular buffer 112, 212 and of the second circular buffer 106, 206, the at least M initial interpolation time instants are written at block 520 into the first circular buffer 112, 212.

After the initialization phase, the search for the correlation peaks in correspondence of the dibits of the next servo burst starts. The counter k 118, 218 is incremented synchronously with the sampling of the servo reader waveform at block 530. Based on the counter value, the current time since last counter reset is computed (at block 530) as $k \cdot T_c$. The interpolation index m is reset to 1 at block 540. A comparison block 120, 220a, 220b compares (at block 550) the current time and the next interpolation time instant $t_n$. If (at block 550) the current time doesn't exceed the interpolation time instant, $kT_c \leq t_{n+m-1}$, no interpolation is performed within the current clock cycle and the next clock cycle with a new servo reader sample is considered by jumping back to block 530. If, on the other hand, the current time exceeds the interpolation time instant, $kT_c > t_{n+m-1}$, then a sequence of servo channel operations is initiated at block 560.

In a first step at block 560, the interpolation time instant $t_{n+m-1}$ is provided to the interpolator 104, 204 from the first circular buffer 112, 212 (circular buffer 1). The interpolator 104, 204 generates one interpolated sample $r(t_{n+m-1})$ from the most recent servo samples, r(k) and r(k−1), and outputs it into the second circular buffer 106, 206 (circular buffer 2). N interpolated samples from the second circular buffer 106, 206 are then output into the correlator 108, 208, which generates one correlation output sample $c(t_{n+m-1})$ and provides it to the correlation-peak detection and peak-time computation unit 114, 214. This correlation-peak detection unit 114, 214 searches for a peak in the sequence of correlation output samples and checks whether a valid correlation peak is observed within the current peak search window. Upon detection of a valid correlation peak, the monitoring and estimation function unit 116, 216 updates the peak search window to define the search range for the next correlation peak within the servo burst, based on the current correlation peak location and the servo frame structure. The interpolation time computation unit 110, 210 generates a new interpolation time instant ($t_{n+m-1+D1}$) based on the step interpolation interval $T_{int,l}$ as provided by the monitoring and estimation function unit 116, 216 and outputs the step interpolation interval $T_{int,l}$ to the first circular buffer 112, 212. Finally, the read and write pointers of both circular buffers 106, 206, 112, 212 are advanced by one position to prepare for the next servo channel operation.

Based on the knowledge of the previously detected correlation peaks and the servo frame structure, the monitoring and estimation function unit 116, 216 detects (at block 570) whether the end of the current servo burst has been reached. If not, the monitoring and estimation function unit 116, 216 increments by one (at block 580) the interpolation index m, and the current time is compared with the next interpolation time instant, $t_{n+m-1}$ at block 550. If $kT_c > t_{n+m-1}$, the sequence of servo channel operations is repeated at block 560. The iterations proceed by the monitoring and estimation function unit 116, 216 incrementing the interpolation index m until one of the conditions $kT_c \leq t_{n+m-1}$ or m>M is verified. Note that the maximum number of iterations per clock interval cannot exceed M, given the limit (8) on the maximum tape velocity. If a correlation peak is detected and the end of a servo burst is reached, the monitoring and estimation function unit 116, 216 performs a test (at block 590) to determine whether the end of a servo frame has been reached. If not, servo channel elements are initialized to search for the next servo burst by jumping back to block 510. If the end of a servo frame is reached, the monitoring and estimation function unit 116, 216 estimates the servo channel parameters tape velocity $v_{est,l}$, y-position of the servo reader $y_{est,l}$, and the step interpolation interval $T_{int,l}$, and resets (at block 600) the counter value k to 0. The servo channel parameters may be estimated more than once per servo frame, for example at the end of every second servo burst.

If the end of tape operation has not been reached at block 610, the monitoring and estimation function unit 116, 216 initializes the servo channel 100, 200 for the processing of the next servo frame by jumping back to block 510. Otherwise, the servo channel 100, 200 halts operations at block 620.

Figure 6:
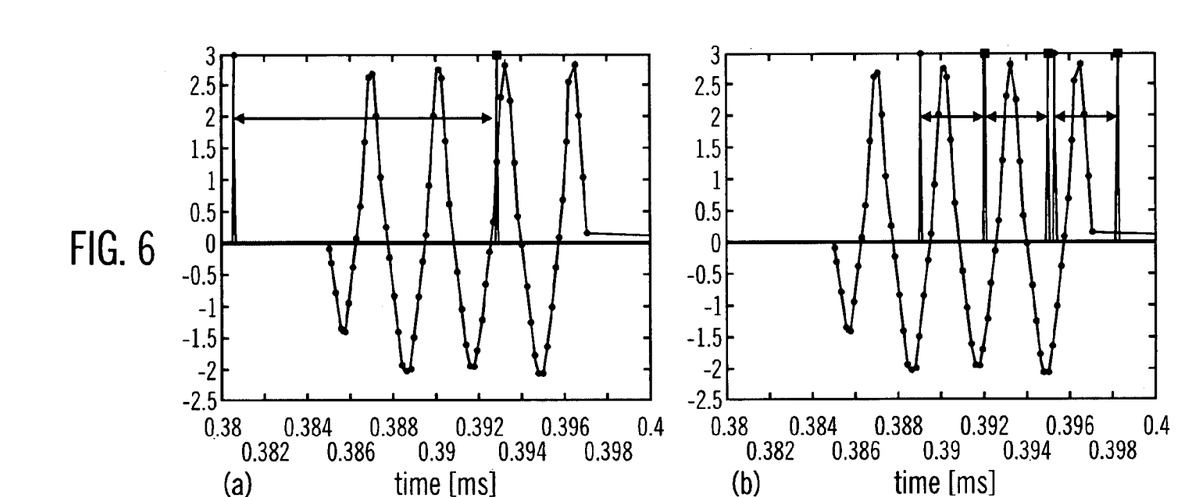
FIGS. 6a, 6b show correlator output sequences and variable and fixed search windows for a tape velocity of 1.6 m/s.
Figure 7:
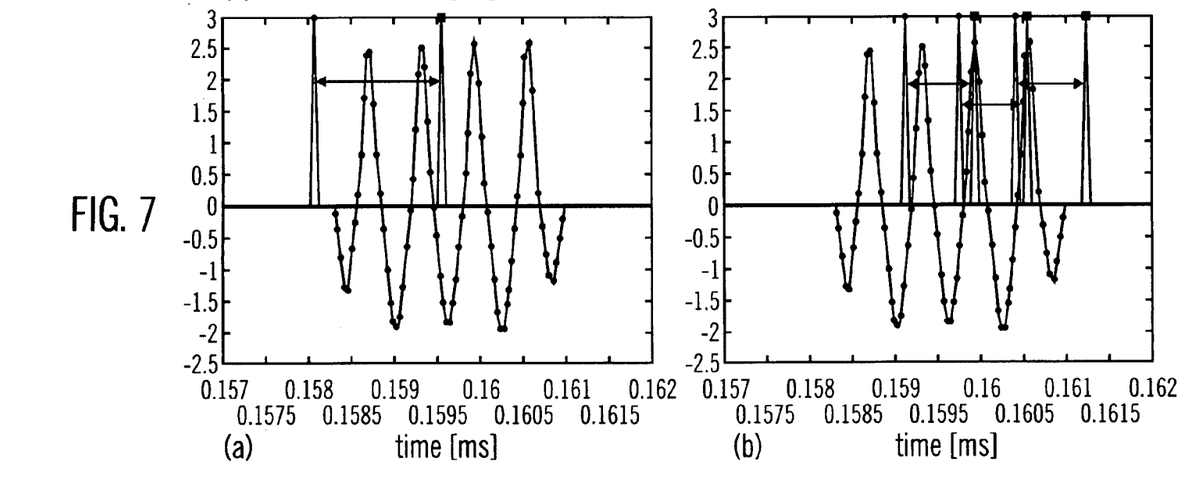
FIGS. 7a, 7b show correlator output sequences and variable and fixed search windows for a tape velocity of 8 m/s.

FIGS. 6 and 7 show correlator 108, 208 output sequences and search windows for tape velocity equal to 1.6 and 8 m/s, respectively. FIG. 6(a) shows a variable search window and FIG. 6(b) shows fixed search windows for tape velocity of 1.6 m/s. FIG. 7(a) shows a variable search window and FIG. 7(b) shows fixed search windows for tape velocity of 8 m/s.

Described embodiments provide a correlation method using a dibit reference waveform that yields optimal detection of the peaks of the correlation function. The dibit locations, which provide the required timing information for the interpolation of servo signal samples, are obtained by estimating the time instants at which the correlation peaks occur. In certain embodiments, a fixed ADC clock is utilized for the clocking of the correlator circuitry. Consequently the number of correlator output samples that must be generated per clock period is not fixed and depends on the tape velocity. The correlator circuitry includes circular buffers for the efficient computation of a variable number of correlation samples at each clock interval.

In certain embodiments, between two consecutive servo bursts, a variable search window is defined to increase the probability of correct detection of the first correlation peak of the next servo burst, even in the presence of large uncertainty in the peak-arrival time. Fixed search windows are defined within a servo burst to detect the servo dibit locations following the first dibit. The structure of the servo bursts and the narrow dibit spacing allow a precise definition of the search windows, leading to a reduced false alarm probability.

Certain embodiments provide a variable search window, which depends on the tape velocity, for the first dibit location within a new servo burst, together with the application of correlation-based dibit detection, to improve the robustness of the time-base generation against noise and rapidly changing servo channel parameters. Certain embodiments improve the quality of timing information derived from correlation peaks over the timing obtained from individual servo signal peaks, which leads to smaller jitter in the time instants for signal interpolation. This in turn results in lower standard deviation of position-error signal for track-following servo and improved reliability of LPOS symbol detection.

Additional Embodiment Details

The described components of the servo channel 100, 200 described with respect to FIGS. 3 and 4 may comprise discrete logic, ASIC (application specific integrated circuit), FPGA (field programmable gate array), custom processors, etc.

The described components of the servo channel embodiments and the operations of the servo channel components described with respect to FIGS. 3 and 4 may alternatively be implemented in subroutines in programs or other software implementations executed by a processor. Such programs implementing the operations of the servo channel components described with respect to FIGS. 3 and 4 may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

The components shown in FIGS. 3 and 4 as separate components may be implemented in a single circuit device or functions of one illustrated component may be implemented in separate circuit devices. Moreover, operations described with respect to certain components, such as generating the interpolation time instants and correlating the data, may be performed by other components in the servo channel. The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

The term logic may include, by way of example, software, hardware, firmware, and/or combinations of software and hardware.

The logic of FIG. 5 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 5 may be implemented in software, hardware, programmable and non-programmable gate array logic or in some combination of hardware, software, and/or gate array logic.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method for recovering servo information from a synchronous servo channel, comprising:
    reading, by an interpolator, samples of a servo signal obtained from a servo reader at a rate of one servo sample per clock interval, to produce up to M interpolated servo samples per clock interval, wherein M comprises an integer value;
    using a first buffer to buffer interpolation time instants at which the interpolator generates interpolated servo samples;

buffering the interpolated servo samples in a second buffer; and outputting the interpolated servo samples from the second buffer to a correlator to produce correlation signal samples.

2. The method of claim 1, further comprising:

comparing, by M comparators, a current time and at least one next interpolation time instant, wherein the buffering of the interpolated servo samples in the second buffer is performed in response to a result of the comparing.

3. The method of claim 2, wherein the buffering of the interpolated servo samples in the second buffer is performed in response to the current time exceeding at least one of the M interpolation time instants.

4. The method of claim 2, further comprising:

reading an interpolation time instant from the first buffer into the interpolator in response to the current time exceeding at least one of the M interpolation time instants;

generating, by the interpolator, the interpolated servo sample from the read interpolation time instant, wherein the generated interpolated servo sample is buffered in the second buffer.

5. The method of claim 2, further comprising:

generating, by the correlator, a correlation output sample and providing to a unit in response to the current time exceeding at least one of the M interpolation time instants;

searching, by the unit, for a peak in a sequence of correlation output samples;

determining whether a valid correlation peak is detected; and updating a peak search window to define a search range for a next correlation peak in response to detecting the value correlation peak.

6. The method of claim 5, further comprising:

using, by a monitoring and estimation function, a step interpolation interval to produce the updated peak search window during which a peak is detected; and providing, by the monitoring and estimation function, the step interpolation interval to an interpolation time computation to generate a next interpolation time instant to buffer in the first buffer.

7. The method of claim 6, further comprising:

providing the updated peak search window to the correlator, wherein the correlator limits a search range of the correlation peaks to the updated peak search window.

8. The method of claim 1, further comprising:

generating a next interpolation time instant after outputting the interpolated servo samples from the second buffer;

writing the next interpolation time instant to the first buffer;

determining whether an end of a servo burst is reached; and performing an additional iteration of operations of buffering the interpolated servo samples in the second buffer and outputting the interpolated servo samples from the second buffer to the correlator in response to determining that the end of the servo burst is not reached.

9. The method of claim 8, further comprising:

determining whether an end of a servo frame is reached in response to determining that the end of the servo burst is reached; and performing an additional iteration of operations of the reading of the servo signal samples, the using the first buffer, buffering the interpolated servo samples in the second buffer, and outputting the interpolated servo samples from the second buffer to the correlator in response to determining that the end of the servo frame is not reached.

10. A synchronous servo channel, comprising:

an interpolator to read samples of a servo signal obtained from a servo reader at a rate of one servo sample per clock interval to produce up to M interpolated servo samples per clock interval, wherein M comprises an integer value;

a first buffer to buffer interpolation time instants at which the interpolator generates interpolated servo samples;

a second buffer to buffer the interpolated servo samples; and a correlator to receive the interpolated servo samples from the second buffer to use to produce correlation signal samples.

11. The synchronous servo channel of claim 10, further comprising:

M comparators to compare a current time and at least one next interpolation time instant, wherein the buffering of the interpolated servo samples in the second buffer is performed in response to a result of the comparing.

12. The synchronous servo channel of claim 11, wherein the buffering of the interpolated servo samples in the second buffer is performed in response to the current time exceeding at least one of the M interpolation time instants.

13. The synchronous servo channel of claim 11, wherein the interpolator further performs:

reading an interpolation time instant from the first buffer interpolator in response to the current time exceeding at least one of the M interpolation time instants; and generating the interpolated servo sample from the read interpolation time instant, wherein the generated interpolated servo sample is buffered in the second buffer.

14. The synchronous servo channel of claim 11, wherein the correlator further performs generating a correlation output sample, further comprising:

a correlation peak detection unit to perform operations comprising receive receiving the correlation output sample in response to the current time exceeding at least one of the M interpolation time instants and searching for a peak in a sequence of correlation output samples; and a monitoring and estimation function unit to perform operations comprising determining whether a valid correlation peak is detected and updating a peak search window to define a search range for a next correlation peak in response to detecting the value correlation peak.

15. The synchronous servo channel of claim 10, further comprising:

an interpolation time computation unit to perform operations comprising generating a next interpolation time instant after outputting the interpolated servo samples from the second buffer and writing the next interpolation time instant to the first buffer; and a monitoring and estimation function unit to determine whether an end of a servo burst is reached, wherein an additional iteration of the operations of buffering the interpolated servo samples in the second buffer and outputting the interpolated servo samples from the second buffer to the correlator are performed in response to determining that the end of the servo burst is not reached.

16. A storage drive for performing Input/Output (I/O) operations with respect to a storage medium coupled to the storage drive, comprising:
   a head to read data from the storage medium; and
   a synchronous servo channel incorporated in a storage device, comprising:
      an interpolator to read samples of a servo signal obtained from a servo reader at a rate of one servo sample per clock interval to produce up to M interpolated servo samples per clock interval, wherein M comprises an integer value;
      a first buffer to buffer interpolation time instants at which the interpolator generates interpolated servo samples;
      a second buffer to buffer the interpolated servo samples; and
      a correlator to receive the interpolated servo samples from the second buffer to use to produce correlation signal samples.

17. The storage drive of claim 16, wherein the synchronous servo channel further comprises:
   M comparators to compare a current time and at least one next interpolation time instant, wherein the buffering of the interpolated servo samples in the second buffer is performed in response to a result of the comparing.

18. The storage drive of claim 17, wherein the buffering of the interpolated servo samples in the second buffer is performed in response to the current time exceeding at least one of the M interpolation time instants.

19. The storage drive of claim 17, wherein the correlator further performs generating a correlation output sample, wherein the synchronous servo channel further comprises:
   a correlation peak detection unit to perform operations comprising receive the correlation output sample in response to the current time exceeding at least one of the M interpolation time instants and searching for a peak in a sequence of correlation output samples; and
   a monitoring and estimation function unit to perform operations comprising determining whether a valid correlation peak is detected and updating a peak search window to define a search range for a next correlation peak in response to detecting the valid correlation peak.

20. The storage drive of claim 16, wherein the synchronous servo channel further comprises:
   an interpolation time computation unit to perform operations comprising generating a next interpolation time instant after outputting the interpolated servo samples from the second buffer and writing the next interpolation time instant to the first buffer; and
   a monitoring and estimation function unit to determine whether an end of a servo burst is reached, wherein an additional iteration of the operations of buffering the interpolated servo samples in the second buffer and outputting the interpolated servo samples from the second buffer to the correlator are performed in response to determining that the end of the servo burst is not reached.

* * * * *